Nov. 29, 1938.    C. A. MANN    2,138,660
REFRIGERATING APPARATUS
Filed Oct. 24, 1934    2 Sheets-Sheet 1

INVENTOR.
CECIL A. MANN
BY
ATTORNEY.

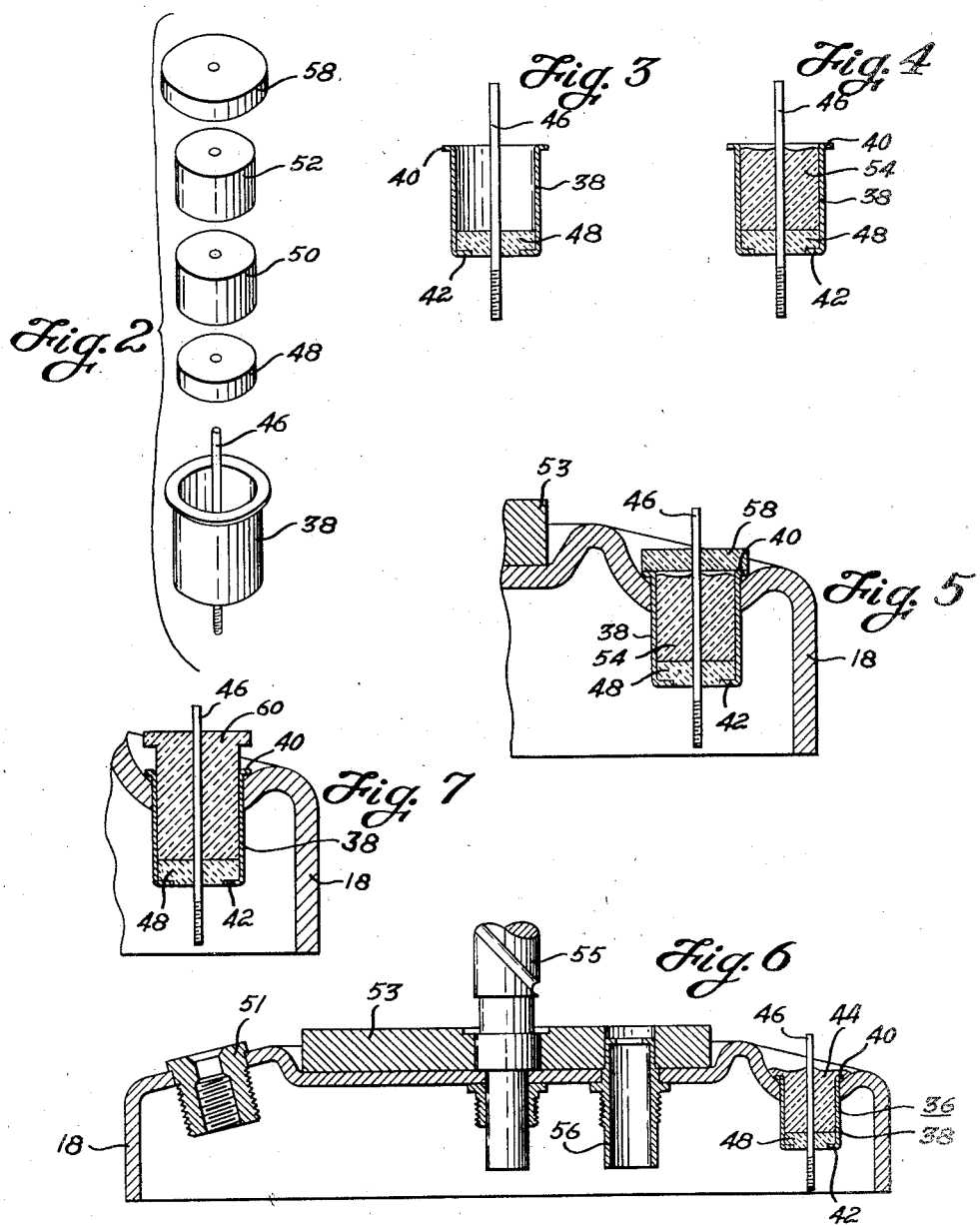

Patented Nov. 29, 1938

2,138,660

UNITED STATES PATENT OFFICE 2,138,660

REFRIGERATING APPARATUS

Cecil A. Mann, Dayton, Ohio, assignor to General Motors Corporation, Dayton, Ohio, a corporation of Delaware Application October 24, 1934, Serial No. 749,787

9 Claims. (Cl. 173—311)

This invention relates to refrigerating apparatus, particularly of the compressor-condenser-expander type and specifically concerns the problem of satisfactorily providing current conducting lead-ins for a hermetically sealed motor-compressor unit for use in refrigerating apparatus.

In refrigerating apparatus and other devices employing a motor-compressor unit in which both the motor and compressor are enclosed by a hermetically sealed casing of metal, it is necessary to provide some form of lead-in for carrying current to the motor through the wall of the hermetically sealed housing which not only insures perfect insulation of the conductor from the housing, but also maintains a hermetic seal. Heretofore, in providing lead-ins for compressors of the present type, it has been customary either to provide a resilient insulating material which is clamped in place after the manner of a stuffing box or to utilize a vitreous insulating material such as glass which is packed in position around the conductor wire while heated to a plastic condition. It has been found after testing numerous motor-compressor units having lead-ins of the aforementioned types that slight variations occurring in quantity production cause a considerable percentage of such units to leak at the lead-in. It will be readily seen that in a motor-compressor unit for a refrigerating apparatus, any leak, no matter how minute, will result in eventually reducing the charge of refrigerant in the apparatus to a point where it will no longer operate efficiently, if at all, and inasmuch as the sole reason for utilizing a hermetically sealed motor-compressor unit in a refrigerating apparatus is to prevent the possibility of leakage and consequent loss of the refrigerant charge, it becomes extremely important to eliminate all possibilities for leakage.

It is an object of the present invention, therefore, to provide a novel motor-compressor unit having a lead-in conductor which is imperviously sealed to a wall of the housing of a motor-compressor unit, as well as electrically insulated therefrom.

A further object is to provide a novel manner of assembling portions of a motor-compressor unit of a hermetically sealed type for providing an impervious seal and insulation at the lead-in conductor.

A further object is to provide a motor-compressor unit having hermetically sealed and electrically insulated lead-in conductors which may be produced at low cost and to provide a novel method for constructing the same.

Further objects and advantages of the present invention will be apparent from the following description, reference being had to the accompanying drawings, wherein a preferred form of the present invention is clearly shown.

In the drawings:

Fig. 2 is a view showing the parts of the lead-in construction in disassembled relation before fusing;

Fig. 3 is a cross section of a conductor lead-in bushing at a preliminary stage of assembly;

Fig. 4 is a view corresponding to Fig. 3 showing the construction of the bushing at a later stage of manufacture;

Fig. 5 is a sectional view of a portion of the motor-compressor unit showing the lead-in bushing at a still later stage of manufacture;

Fig. 6 is a cross section of a portion of a motor-compressor unit showing a finished lead-in bushing; and Fig. 7 is a view corresponding to Fig. 5, but showing an optional method of constructing the bushing.

Figure 1:
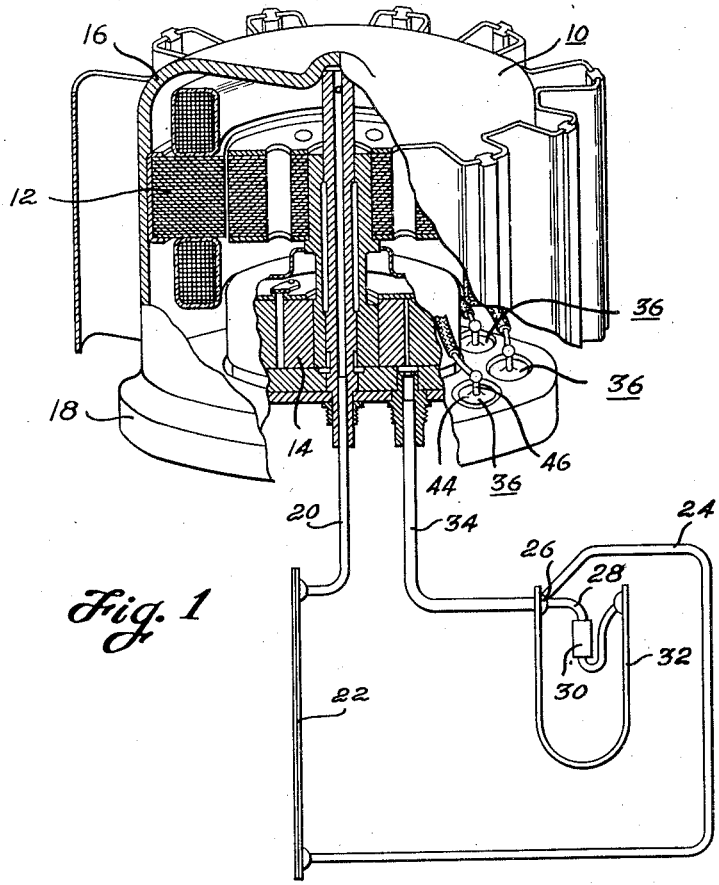
Fig. 1 is a diagrammatic view of a refrigerating apparatus embodying the present invention, a portion of the compressor thereof being broken away and shown partially in section.

Referring now to Fig. 1, there is shown a refrigerating apparatus comprising a hermetically sealed motor-compressor unit 10 which includes a motor 12, a compressor 14 and a sealed housing comprising a dome portion 16 and a base portion 18 which may be assembled together and suitably sealed to each other as by welding. The compressor 14 delivers compressed refrigerant through a conduit 20 to a condenser 22 where the refrigerant is liquefied and delivered by means of conduit 24 to a heat interchanger 26, whence the cooled liquid refrigerant passes by the conduit 28 to a refrigerant flow control device 30 which may comprise a fixed restrictor in the form of a passage of small cross section but great length. The expanding refrigerant leaving the restrictor 30 enters the evaporator 32 where it vaporizes, withdrawing heat from an object to be cooled (not shown). The vaporized refrigerant is returned to the compressor through a conduit 34 for recompression.

In order to provide for delivering current to the windings of the motor 12 from a source outside the housing 16, the lead-in conductors generally designated as 36, are provided in the base 18. The leads for the motor windings are connected to the lead-in conductors 36, while the outer ends of the conductors 36 are suitably connected to the usual supply line through the necessary control switches. In their finished form (see Fig. 6) the lead-in conductors 36 comprise a metallic cylindrical bushing 38 having an outwardly turned flange 40 at the top and an inwardly turned flange 42 at the bottom. The bushing 38 is filled with a body of vitreous insulating material 44 which surrounds the conductor wire 46 which in turn is centrally located within the bushing 38. The bottom portion of the bushing 38 is filled with a plug or pellet 48 of a refractory material which is provided for a purpose later to be described.

According to the present invention, the method of constructing the lead-in conductors 36 comprises first forming a tubular bushing 38, the material of which is selected in accordance with the nature of the vitreous material which is to fill the bushing when completed. It is preferred to form the bushing 38 of enamelling iron. A short length of wire of the same material of the proper size to properly conduct the maximum current drawn by the motor is located centrally of the bushing 38 and in such relation thereto as to project both above and below the bushing. While the conductor wire is thus positioned, a perforated pellet 48 of refractory material is inserted in the bottom of the bushing 38 and tightly packed in position. The pellet 48 is formed of any suitable raw refractory material having the properties of forming a firm refractory body which will maintain its strength without sagging at the temperatures required to fuse the vitreous body 44. For example, many of the well known fire clays are suitable, particularly when mixed with about an equal quantity of feldspar. The purpose of the refractory pellet 48 is merely to hold the conducting wire 46 in proper location during the construction of the lead-in and to prevent the fused vitreous body 44 from running out the bottom of the bushing when in a molten condition. At the time the pellet 48 is first assembled into the bushing 38, it is in a somewhat plastic condition sufficient to permit it to be readily packed or tamped into the bottom of the bushing to effectively seal the same during the subsequent steps in production of the lead-in and to pack tightly around the conductor wire 46 to maintain its location properly. A lead-in bushing assembled to the point thus far described is illustrated in Fig. 3.

The bushing is next filled to substantially the top with a vitreous frit. The frit used is essentially the same as any of the various frits used in the porcelain enameling art for coating metal articles and it is preferred to utilize a frit of the ground coat type. The body of frit thus inserted may be either in a loose form and mixed with sufficient water to make it a somewhat plastic mass, or may be in the form of a pre-formed pellet such as pellet 50 in Fig. 2. A second preformed pellet 52 is then slipped over the conductor 46 to rest on the previously inserted body of frit and to extend above the top of the bushing 38 so as to provide sufficient material to substantially fill the bushing after the frit has boiled down in the firing operation. The bushing assembled to the stage thus far described is then placed in a furnace and heated to the proper temperature for a sufficient length of time to fuse the frit in the bushing 38. It is preferred to continue the firing operation sufficiently long to permit the frit to boil down to the stage where gas bubbles are no longer formed in order to insure that the body of vitreous material in the lead-in will be homogeneous and without voids. The length of time necessary will vary according to the composition of the frit and the temperature of firing, but in general, should be from one to four hours. The condition of the lead-in after this operation is illustrated in Fig. 4 wherein there is shown the fused body of vitreous material 54, substantially filling the bushing 38 above the pellet 48.

The bushing is next assembled into a suitable aperture in the base member 18 and a small quantity of spelter material is applied to the joint between the bushing 38 and the aperture in the base plate 18. Another pre-formed pellet 58 of the same vitreous frit is then located on top of the bushing 38 and the assembly again fired in a suitable furnace. The second firing operation fuses the pellet 58 and remelts the body of vitreous material 54 causing the two to unite into the homogeneous body of vitreous material 44, which, due to the added material provided by the pellet 58, overflows the top of the bushing 38 and seals the same to the base member 18 which as shown is formed with a suitable depression adjacent the bushing 38. The spelter material is also melted during the second firing operation which causes a braze to be made at the joint between the bushing 38 and the plate 18.

It is preferred to conduct the second firing operation at the same time that other portions of the compressor mechanism such as the filling plug 51, the bottom plate 52 and the shaft 55 and the inlet connection 56 are brazed to the plate 18. These operations are preferably conducted in a furnace having a reducing atmosphere in order to secure conveniently a satisfactory brazed joint. In this preferred practice of the invention, a vitreous frit is selected for the lead-in bushing which has satisfactory fusing characteristics in a reducing atmosphere. Such a frit should have minimum percentages of oxides which upon reduction at the surface of the molten frit body form a layer of a conducting metal. Likewise, it is preferred to use a frit which has a minimum tendency to boil in a reducing atmosphere such as is displayed by many frits having large percentages of readily reducible oxides.

The lead-in conductor which is formed by the method heretofore described presents several advantages over lead-ins heretofore constructed. In addition to being capable of manufacture at relatively low cost, the present method produces a lead-in which not only has permanent electrical insulating qualities of a high character due to the vitreous nature of the insulating body 44 but also provides a hermetic seal which likewise is permanent and in which the occurrence of minute leaks due to variations arising in production in large quantities is minimized. The seal provided between the body of vitreous material 44 and both the conductor 46 and the bushing 38 is far superior to that obtained by any previous method. While the exact nature of the junction between the metal and the vitreous body is not known at present, it has been found upon breaking apart a large number of lead-ins constructed in this manner that the adhesion of the vitreous body to the metal is greater than the cohesion of the vitreous body itself.

It will be understood, of course, that various other forms of lead-ins may be constructed and that the method of construction may be modified. For example, the method may be followed such as that illustrated in Fig. 7 in which the bushing 38, the refractory pellet 48 and all of the vitreous frit required are assembled together, and, without pre-firing, the bushing and assembled parts are inserted in the aperture in the base plate with the application of a suitable spelter. The vitreous material is fired in one operation which preferably takes place at the same time the brazing of the other compressor parts to the base 18 is performed. Fig. 7 also illustrates the use of but a single pre-formed pellet 60 of vitreous frit which serves to provide sufficient frit to substantially fill the bushing 38 and to overflow the top thereof.

In some applications of the present invention, depending somewhat on the nature of the refractory material used for the pellet 48 and upon the subsequent treatment of the base plate assembly after the final firing operation, it may be desirable to remove the refractory pellet 48. For example, if a refractory material is used for the pellet 48, which does not glaze on the outer surface during firing and if the base plate assembly is subjected to pickling, plating or other treatments after firing, which will cause the refractory pellet to absorb acids, the lower portion of the bushing 38 may be turned off with a suitable tool and the refractory pellet removed to expose the lower surface of the vitreous body 44 which is, of course, glass hard and impervious to moisture or acids.

While the form of embodiment of the invention as herein described, constitutes a preferred form, it is to be understood that other forms might be adopted, all coming within the scope of the claims which follow.

What is claimed is as follows:

1. The method of forming a fluid tight insulated lead-in for a sealed motor-compressor unit which comprises forming an aperture in a wall of the unit, placing in the aperture a pre-fired assembly comprising a metal bushing and a conductor secured therein by a body of vitreous insulation, placing a body of vitreous frit around the conductor above the body of vitreous insulation, applying spelter material adjacent the bushing in the aperture, and simultaneously firing the entire assembly at a temperature to both braze the metal bushing to the wall of the unit and to melt the frit.

2. The method of forming a fluid tight insulated lead-in for a sealed motor-compressor unit which comprises forming an aperture in a wall of the unit, placing in the aperture a pre-fired assembly comprising a metal bushing and a conductor secured therein by a body of vitreous insulation, placing a body of vitreous frit around the conductor above the body of vitreous insulation, applying spelter material adjacent the bushing in the aperture, and simultaneously firing the entire assembly at a temperature to both braze the metal bushing to the wall of the unit and to melt the entire body of vitreous material associated with said sleeve and conductor.

3. The method of forming a base for a sealed motor-compressor unit having an apertured metallic housing member which comprises assembling a metal bushing, a conductor and a body of vitreous frit in said aperture, applying spelter to portions of the metal parts and firing the entire assembly at a temperature to both braze metal parts together and melt the vitreous frit.

4. The method of forming a base for a sealed motor-compressor unit having an apertured metallic housing member which comprises assembling a metal bushing, a conductor and a body of vitreous frit in said aperture, applying spelter to portions of the metal parts and firing the entire assembly at a temperature to both braze metal parts together and melt the vitreous frit, and in a reducing atmosphere.

5. The method of forming a base for a sealed motor-compressor unit which comprises assembling a plurality of metal compressor parts including an apertured housing member, assembling a metal bushing, a conductor and a body of vitreous frit in said aperture, applying spelter to portions of the metal parts and firing the entire assembly at a temperature to both braze the metal parts together and melt the vitreous frit, and in a reducing atmosphere, the inner surface of said bushing and the outer surface of said conductor being formed of enamelling iron, and said vitreous material comprising a porcelain enamel.

6. The method of forming a base for a sealed motor-compressor unit which comprises assembling a plurality of metal compressor parts, forming a metallic walled aperture in the base, supporting a conductor in said aperture but out of contact therewith by a structure sealing one end of said aperture and made of material which does not become molten at the firing temperature used, filling the space between the conductor and the aperture walls with a vitreous frit which becomes molten at the firing temperature used, applying spelter to portions of the metal parts and firing the entire assembly at a temperature to both braze the metal parts together and melt the vitreous frit.

7. The method of forming a fluid-tight insulated lead-in for a sealed motor-compressor unit which comprises forming a cup-shaped metallic bushing member with an aperture at its bottom, placing a perforated pellet of a refractory material in the bottom of said bushing for closing said aperture and for supporting a conductor in said aperture out of contact with the walls of said aperture during firing, which refractory material does not become molten at the firing temperature used, placing a vitreous frit in said cup-shaped bushing, firing the assembly at a temperature to melt the frit, cooling the assembly, and then removing the pellet of refractory material.

8. The method of forming a fluid-tight insulated lead-in which comprises forming a metal bushing member with an aperture at its bottom, placing a perforated pellet of refractory material in the bottom of said bushing for closing said aperture and for supporting a conductor in said aperture but out of contact with the walls of said aperture, which refractory material does not become molten at the firing temperature used, placing a vitreous frit between said conductor and the walls of said bushing, which frit being substantially free of readily reducible oxides, firing the assembly in a reducing atmosphere at a temperature to melt the frit, cooling the assembly, and then removing the pellet of refractory material.

9. The method of forming a casing for a sealed motor compressor which comprises nesting one or more metal compressor parts with portions of a metal casing part, nesting a lead-in with a portion of said metal casing part, said lead-in having an outer metal bushing and an insulated conductor supported therein by means of a pellet of refractory material, which refractory material does not become molten at normal firing temperatures, placing spelter material to the joints between the metallic parts, placing a vitreous frit substantially free of readily reducible oxides between said outer metal bushing and said insulated conductor therein, and firing the assembly in a reducing atmosphere to a temperature to melt the frit and the spelter material.

CECIL A. MANN.